(12) United States Patent
Lin et al.

(10) Patent No.: US 12,273,877 B2
(45) Date of Patent: Apr. 8, 2025

(54) METHOD AND APPARATUS FOR SPAN PATTERN REPETITIONS OVER MULTIPLE SLOTS

(71) Applicant: Samsung Electronics Co., Ltd., Suwon-si (KR)

(72) Inventors: Qiongjie Lin, Sunnyvale, CA (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/652,262

(22) Filed: Feb. 23, 2022

(65) Prior Publication Data

US 2022/0287063 A1 Sep. 8, 2022

Related U.S. Application Data

(60) Provisional application No. 63/155,998, filed on Mar. 3, 2021, provisional application No. 63/239,654, filed on Sep. 1, 2021, provisional application No. 63/256,909, filed on Oct. 18, 2021, provisional application No. 63/283,848, filed on Nov. 29, 2021,
(Continued)

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0169991 A1 | 5/2020 | Lin | |
| 2021/0037607 A1 | 2/2021 | Hamidi-Sepehr et al. | |
| 2022/0322156 A1* | 10/2022 | Kim | H04W 76/28 |

(Continued)

FOREIGN PATENT DOCUMENTS

WO 2020033652 A1 2/2020

OTHER PUBLICATIONS

International Search Report and Written Opinion issued Jun. 30, 2022 regarding International Application No. PCT/KR2022/003007, 6 pages.
(Continued)

*Primary Examiner* — Hong Shao

(57) ABSTRACT

Methods and apparatuses for a repeated pattern over multiple slots in a wireless communication system. A method of operating a user equipment includes receiving a configuration for search space sets, determining a combination (X, Y), and determining a bitmap for a search space set from the search space sets based on the configuration. Each bit in the bitmap is associated with a slot within a group of X consecutive slots. A physical downlink control channel (PDCCH) reception occasion in a slot is present if the associated bit for the slot in the bitmap has a value of "1" and is absent if the associated bit for the slot in the bitmap has a value of "0". Bits with a value of "1" are consecutive in the bitmap. The method further includes receiving PDCCHs in PDCCH reception occasions that are indicated as present according to the bitmap.

20 Claims, 6 Drawing Sheets

Span pattern of 5 slots = [11000], X= 4slots

Related U.S. Application Data provisional application No. 63/305,480, filed on Feb. 1, 2022.

(56) References Cited

U.S. PATENT DOCUMENTS

2022/0345920 A1* 10/2022 Liu ..................... H04W 24/08
2023/0006803 A1*  1/2023 Shi ..................... H04L 5/0058

OTHER PUBLICATIONS

"3rd Generation Partnership Project; Technical Specification Group Radio Access Network; NR; Physical layer procedures for control (Release 16)", 3GPP TS 38.213 V16.1.0, Mar. 2020, 156 pages.
Samsung, "PDCCH monitoring enhancements for NR from 52.6 GHz to 71", 3GPP TSG RAN WG1 #104, R1-2101195, Jan. 2021, 5 pages.
Sharp, "Remaining issues on PDCCH enhancements for NR URLLC", 3GPP TSG RAN WG1 #100, R1-2000881, Feb. 2020, 9 pages.
Ericsson, "Remaining Issue of PDCCH Enhancements for NR URLLC", 3GPP TSG-RAN WG1 Meeting #100bis, R1-2001784, Apr. 2020, 21 pages.
"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
1 Extended European Search Report issued Jul. 19, 2024 regarding Application No. 22763605.7, 9 pages.

* cited by examiner

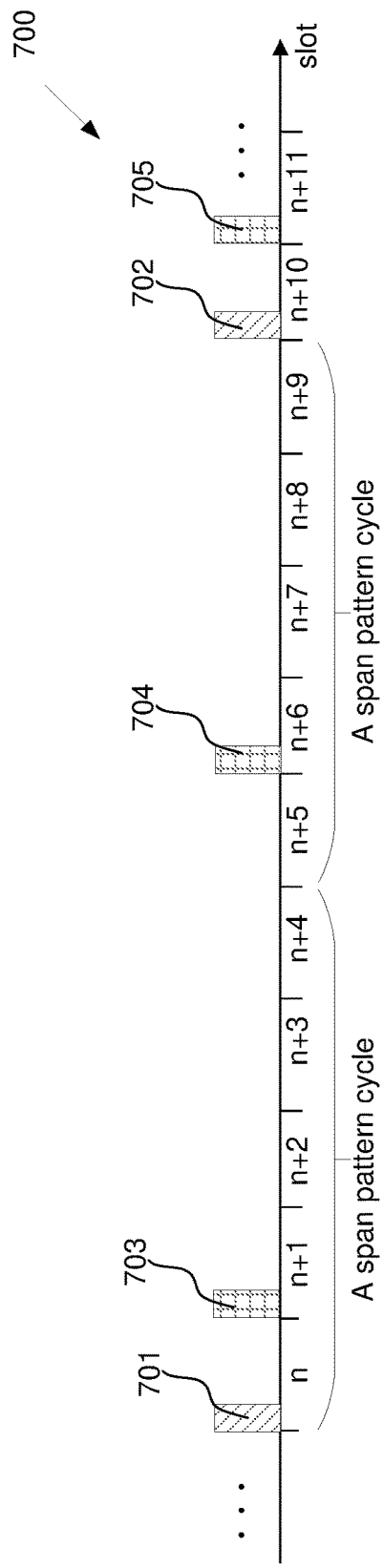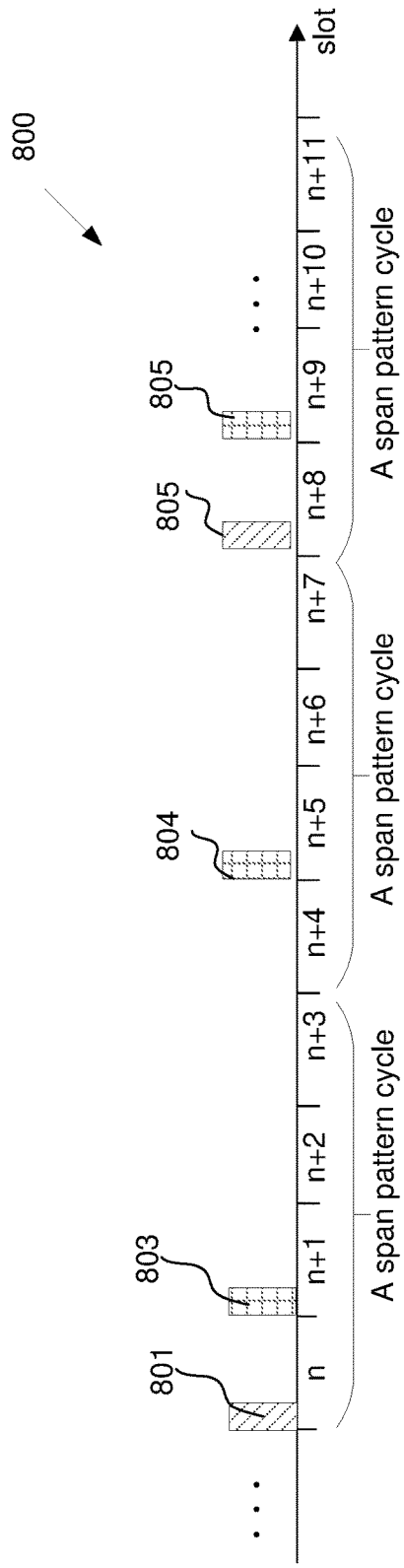

METHOD AND APPARATUS FOR SPAN PATTERN REPETITIONS OVER MULTIPLE SLOTS

CROSS-REFERENCE TO RELATED APPLICATIONS AND CLAIM OF PRIORITY

The present application claims priority to:
U.S. Provisional Patent Application No. 63/155,998, filed on Mar. 3, 2021;
U.S. Provisional Patent Application No. 63/239,654, filed on Sep. 1, 2021;
U.S. Provisional Patent Application No. 63/256,909, filed on Oct. 18, 2021;
U.S. Provisional Patent Application No. 63/283,848, filed on Nov. 29, 2021; and
U.S. Provisional Patent Application No. 63/305,480, filed on Feb. 1, 2022. The content of the above-identified patent document is incorporated herein by reference.

TECHNICAL FIELD

The present disclosure relates generally to wireless communication systems and, more specifically, the present disclosure relates to a repeated pattern over multiple slots in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a repeated pattern over multiple slots in a wireless communication system.

In one embodiment, a user equipment (UE) is provided. The UE includes a transceiver configured to receive a configuration for search space sets and a processor operably coupled to the transceiver. The processor is configured to determine: a combination (X, Y), wherein X and Y are positive integers with Y<X; and a bitmap for a search space set from the search space sets based on the configuration. Each bit in the bitmap is associated with a slot within a group of X consecutive slots. A physical downlink control channel (PDCCH) reception occasion in a slot is present if the associated bit for the slot in the bitmap has a value of "1" and is absent if the associated bit for the slot in the bitmap has a value of "0". Bits with a value of "1" are consecutive in the bitmap. The transceiver is further configured to receive PDCCHs in PDCCH reception occasions that are indicated as present according to the bitmap.

In another embodiment, a base station (BS) is provided. The BS includes a transceiver configured to transmit a configuration for search space sets and a processor operably coupled to the transceiver. The processor is configured to determine: a combination (X, Y), wherein X and Y are positive integers with Y<X; and a bitmap for a search space set from the search space sets based on the configuration. Each bit in the bitmap is associated with a slot within a group of X consecutive slots. A PDCCH transmission occasion in a slot is present if the associated bit for the slot in the bitmap has a value of "1" and is absent if the associated bit for the slot in the bitmap has a value of "0". Bits with a value of "1" are consecutive in the bitmap. The transceiver is further configured to transmit PDCCHs in PDCCH transmission that are indicated as present occasions according to the bitmap.

In yet another embodiment, a method is provided. The method includes receiving a configuration for search space sets and determining: a combination (X, Y), wherein X and Y are positive integers with Y <X; and a bitmap for a search space set from the search space sets based on the configuration. Each bit in the bitmap is associated with a slot within a group of X consecutive slots. A PDCCH reception occasion in a slot is present if the associated bit for the slot in the bitmap has a value of "1" and is absent if the associated bit for the slot in the bitmap has a value of "0". Bits with a value of "1" are consecutive in the bitmap. The method further includes receiving PDCCHs in PDCCH reception occasions that are indicated as present according to the bitmap.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of span pattern for multi-slot PDCCH monitoring with X=4 slots according to embodiments of the present disclosure; and FIG. 8 illustrates another example of span pattern for multi-slot PDCCH monitoring with X=4 slots according to embodiments of the present disclosure.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein:

3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
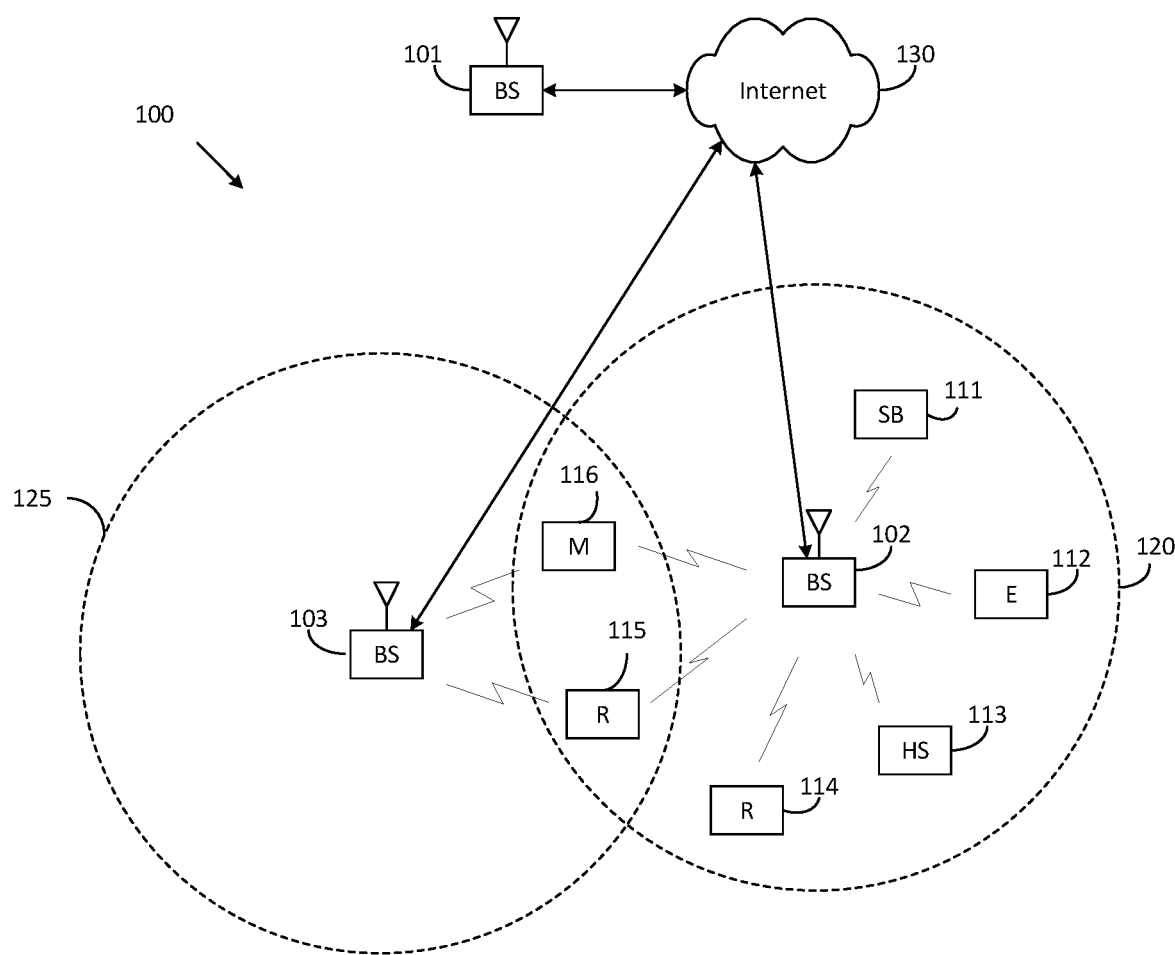
FIG. 1 illustrates an example of wireless network according to embodiments of the present disclosure.
Figure 2:
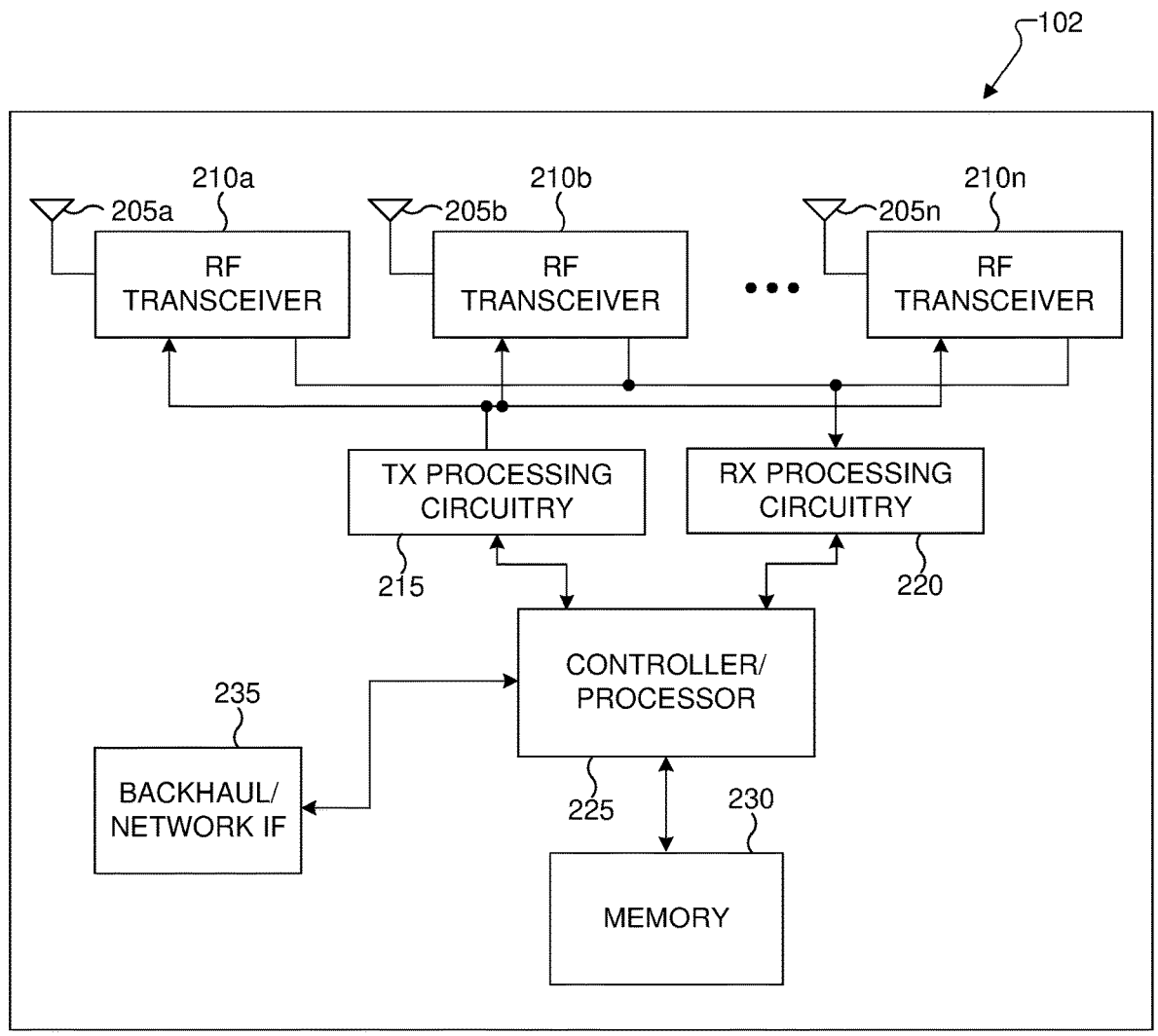
FIG. 2 illustrates an example of gNB according to embodiments of the present disclosure.
Figure 3:
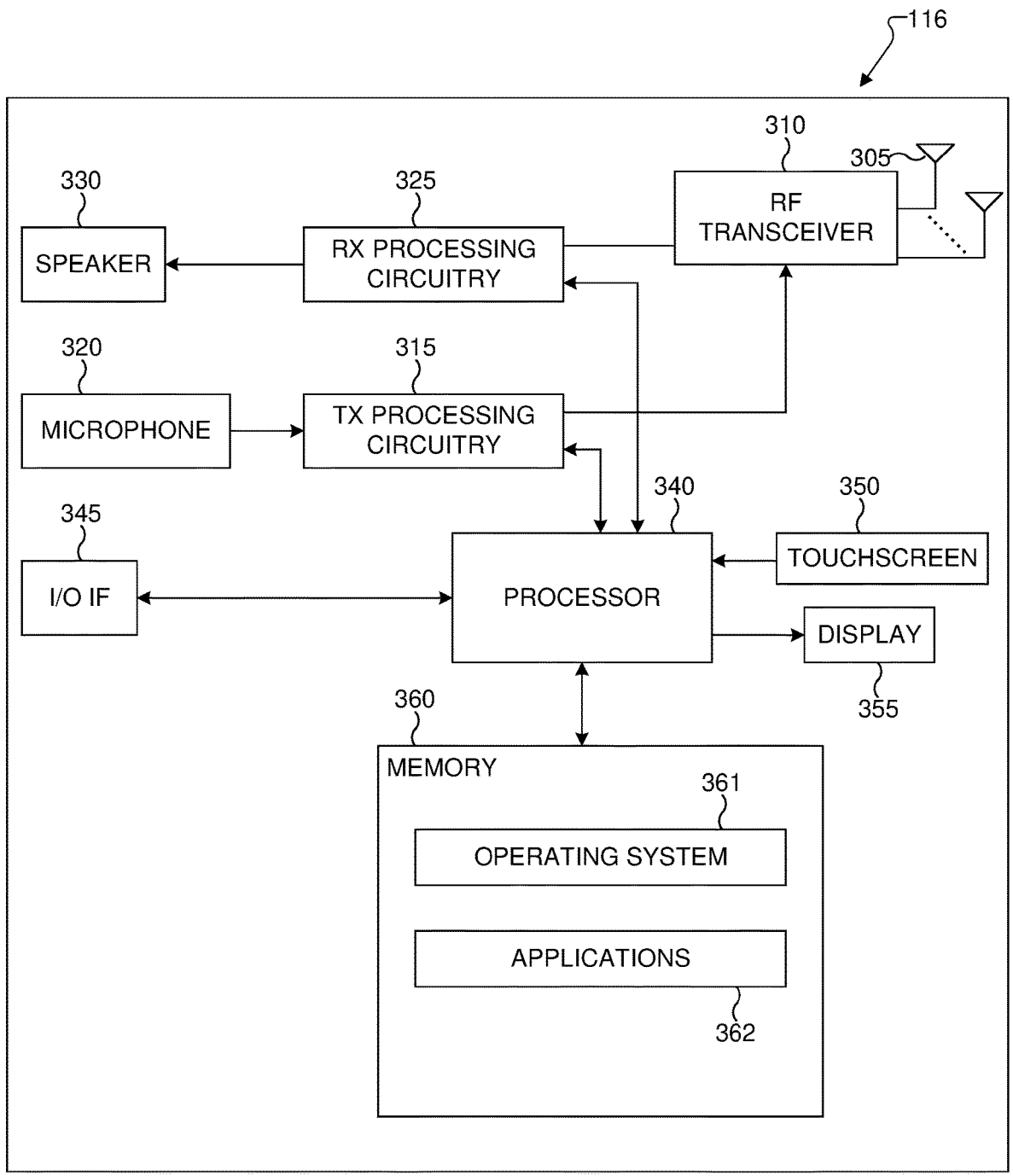
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a repeated pattern over multiple slots in a wireless communication system. In certain embodiments, and one or more of the gNBs 101-103 includes circuitry, programing, or a combination thereof, for a repeated pattern over multiple slots in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a repeated pattern over multiple slots in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a a repeated pattern over multiple slots in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and RS that are also known as pilot signals. A gNB transmits data information or DCI through respective physical DL shared channels (PDSCHs) or PDCCHs. A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
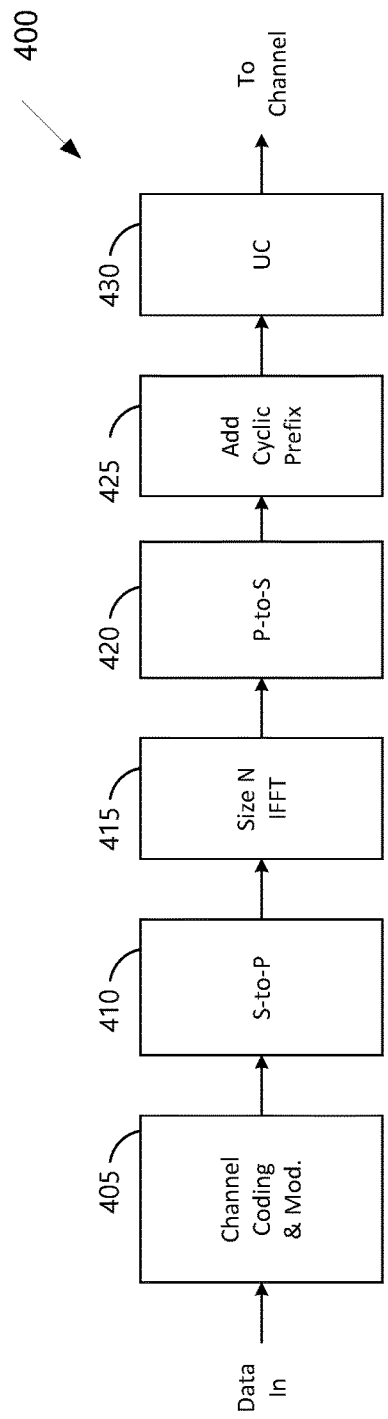
FIGS. 4 and 5 illustrate example of wireless transmit and receive paths according to this disclosure.
Figure 5:
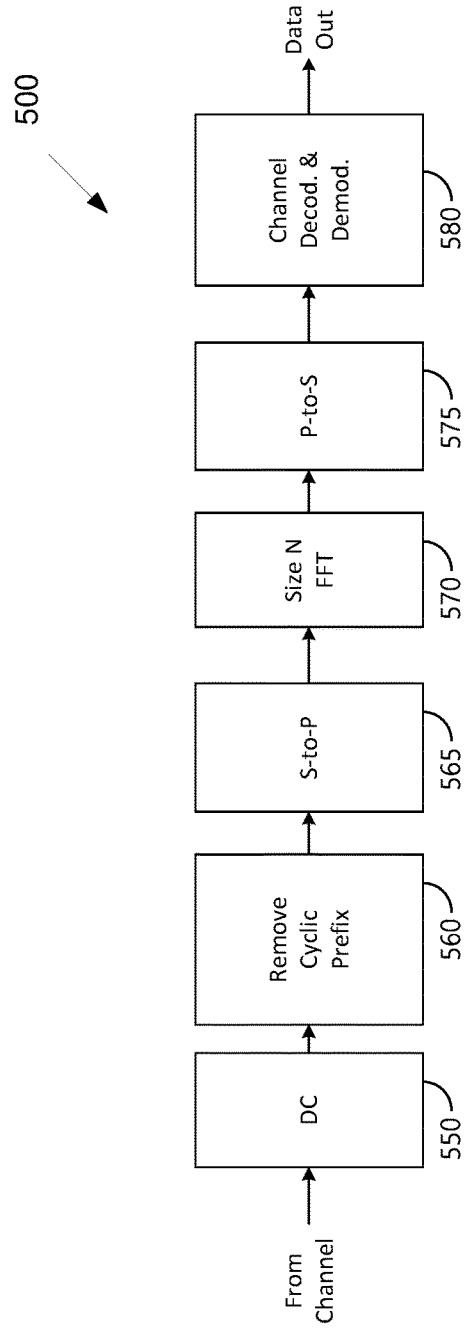

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

NR Rel-15 supports slot-based PDCCH monitoring with maximum number of PDCCH blind decodes (BD) and non-overlapping CCE for channel estimation defined per slot for SCS of 15 kHz, 30 kHz, 60 kHz, and 120 kHz. The corresponding maximum number of PDCCH BD and non-overlapping CCE per slot are respectively defined in 3GPP standard specification.

NR Rel-16 additionally supports span-based PDCCH monitoring where the maximum numbers of PDCCH BDs and CCE limits are defined in 3GPP standard specification for different UE capabilities. Three types of PDCCH monitoring capabilities with combination (X, Y) are supported. The span gap, X, can be 2 or 4 or 7 symbols, while the span duration, Y, is 2 or 3 symbols for SCS configuration $\mu=0,1$, where the SCS is $2^{\mu} \cdot 15$ kHz.

NR operation on a carrier with a frequency between 52.6 GHz and 71 GHz requires an SCS of 120 kHz or larger to overcome phase noise and use the same maximum FFT size as for operation with a lower carrier frequency. Therefore, new maximum numbers for PDCCH BD and non-overlapping CCEs for higher SCS, such as 480 kHz and 960 kHz, need to be defined. The transmission time interval (TTI) in terms of a span duration or a slot duration decreases linearly as the SCS increases.

For a same UE PDCCH monitoring capability as for slot-based or span-based PDCCH monitoring with a maximum SCS of 120 kHz, the PDCCH monitoring overhead within a TTI would materially increase due to the short TTI duration for a high SCS. The larger PDCCH monitoring burden within a shorter TTI can also be challenging for a UE to implement in practice. For example, a UE is not typically able to process a same maximum number of PDCCH BDs/non-overlapping CCEs per slot for SCS of 480 kHz as for SCS of 30 kHz, due to the shorter slot duration for SCS of 480 kHz.

Multi-slot span based PDCCH monitoring can be considered to reduce the large PDCCH monitoring burden within a short TTI at high SCS by increasing a TTI of a slot to a TTI of more than one slots. A PDCCH monitoring capability in terms of maximum numbers of PDCCH BD/non-overlapping CCE at high SCS can be determined for a PDCCH monitoring period of multiple consecutive slots.

For span based PDCCH monitoring in NR Rel-16, a span pattern based on a bitmap in size of 14 is introduced, wherein each bit in the bitmap corresponds to a symbol in a slot, and UE assumes the span pattern is repeated in every slot. For multi-slot based PDCCH monitoring, a repeated span pattern can also be considered. However, the span pattern duration should be extended from one slot to multiple slots.

Therefore, there is a need to consider span pattern repeated in a cycle potentially larger than one slot for multi-slot based PDCCH monitoring.

There is another need to consider adaptation on span pattern, such as location of a span per span pattern cycle.

A first embodiment of this disclosure considers a span pattern repeated in a cycle of $Z \geq 1$ slots for multi-slot PDCCH monitoring based on a minimum span gap of $X \geq 1$ slots.

For multi-slot PDCCH monitoring, a UE is configured to monitor PDCCH in a span of one or more consecutive PDCCH monitoring occasions. There is a minimum time separation of $X \geq 1$ slots or $X \geq 14$ symbols between the start of two consecutive spans, where each span is either of length up to Y consecutive OFDM symbols of a slot or of length up to Y consecutive slots. Spans do not overlap. One or more applicable values for X or Y can be reported by the UE or predefined in the specification. For example, (X, Y) can be any of (4, 1), (4, 2), (8, 1) or (8, 4).

The UE can determine a span pattern cycle of $Z \geq 1$ slots or $Z \geq 14$ symbols. Every span is contained in a single span pattern cycle. A single span pattern cycle consists of one or more spans. The same span pattern repeats in every span pattern cycle of Z slots (or symbols). The separation between consecutive spans within and across span pattern cycles may be unequal but the same (X, Y) restriction may be satisfied by all spans. Every monitoring occasion is fully contained in one span. In one example, the separation between consecutive spans within and across span pattern cycles are unequal. In another example, the separation between consecutive spans within and across span pattern cycles are equal.

In one example, the UE expects the same span pattern if there are configured PDCCH monitoring occasions within a span cycle of Z slots, where the span pattern includes any of the following: (1) a number of spans per span pattern cycle; (2) a maximum number of spans per span pattern cycle; (3) location of the first slot for a span within a span pattern cycle; (4) span duration for i-th span within a span cycle; (5) maximum span duration for a span within a span pattern cycle; or (6) location of a span duration up to Y slots within a span pattern cycle, where the location can be the smallest slot index within a span pattern cycle that can be configured as the first slot for a span of PDCCH monitoring occasion(s), or the largest slot index within a span pattern cycle that can be configured as the last slot for a span of PDCCH monitoring occasion(s).

For determining the location of a span up to Y slots, the present disclosure provide flowing methods.

In one embodiment of method, the location of a span can be determined based on configuration of search space sets.

In another embodiment of method, the location can be predetermined, where: (1) the smallest slot index within a span pattern cycle that can be configured as the first slot for a span of PDCCH monitoring occasion(s) is predetermined, for example to the be first slot within a span pattern cycle; or the largest slot index within a span pattern cycle that can be configured as the last slot for a span of PDCCH monitoring occasion(s) is predetermined, for example to be the Yth slots within a span pattern cycle.

In yet another embodiment of method, the location can be configured by higher layers, where: (1) the smallest slot index within a span pattern cycle that can be configured as the first slot for a span of PDCCH monitoring occasion(s) can be configured. For example, with applicable value to be 0 to (Z–Y); or the largest slot index within a span pattern cycle that can be configured as the last slot for a span of PDCCH monitoring occasion(s) can be configured. For example, with applicable value to be Y–1 to Z–1.

Figure 6:
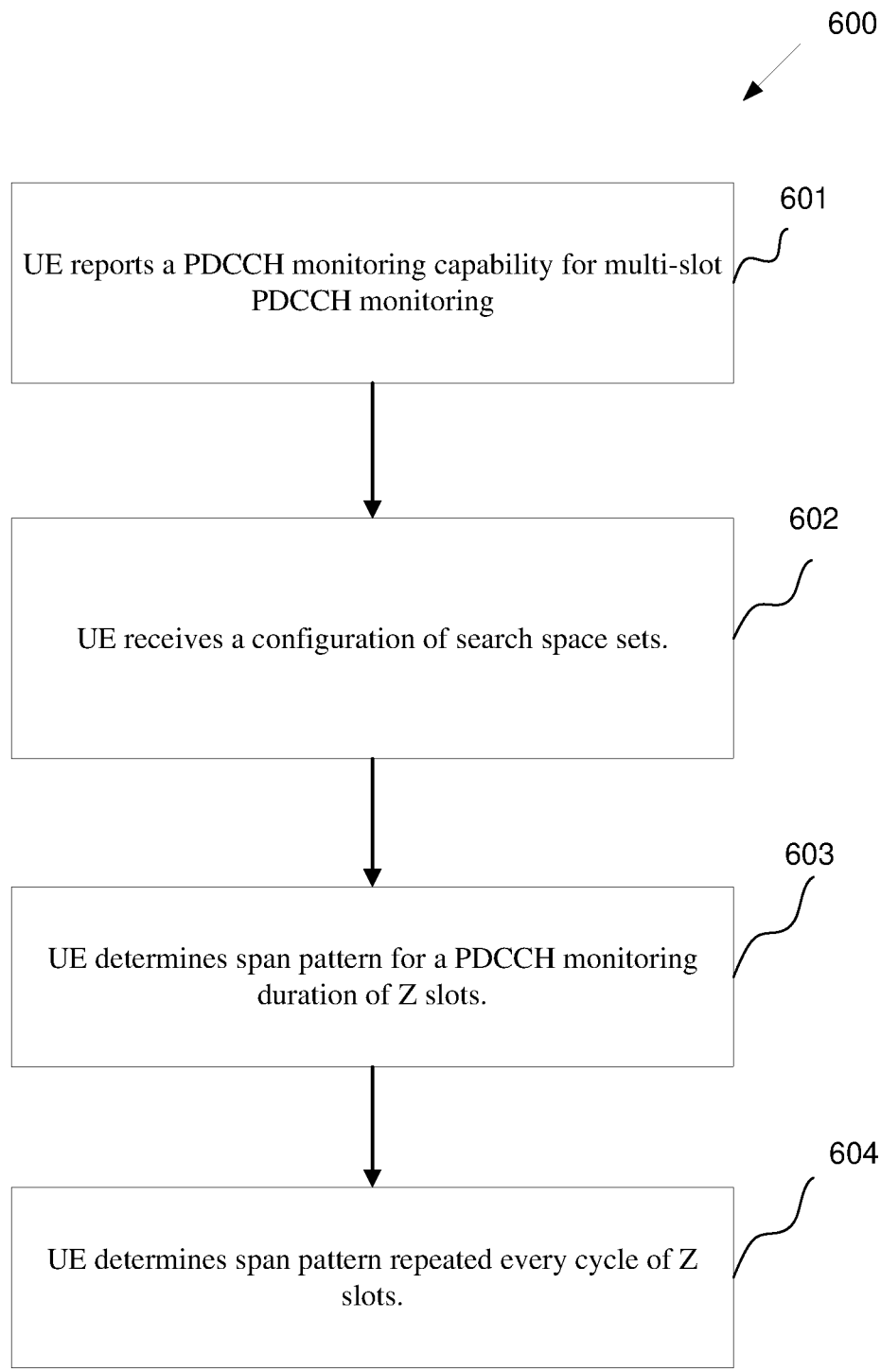
FIG. 6 illustrates a flowchart of a UE method for determining span pattern for multi-slot PDCCH monitoring according to embodiments of the present disclosure.

FIG. 6 illustrates a flowchart of a UE method 600 for determining span pattern for multi-slot PDCCH monitoring according to embodiments of the present disclosure. The UE method 600 as may be performed by a UE (e.g., 111-116 as illustrated in FIG. 1). An embodiment of the UE method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE reports a PDCCH monitoring capability for multi-slot PDCCH monitoring in step 601. The PDCCH monitoring capability report includes one or more values for minimum span gap of X slots (or symbols) between two consecutive spans. The UE receives a configurations of a number of search space sets in step 602. The UE determines a span pattern for a PDCCH monitoring duration of Z slots (or symbols) in step 603. The UE determines the span pattern repeated every cycle of Z slots (or symbols) in step 604.

In a first approach for determining a span pattern, a bitmap b(l), $0 \leq l \leq Z-1$ is generated, where b(l)=1 if slot l in the span pattern has at least one monitoring occasion, and b(l)=0 otherwise. The first span in the span pattern begins at the smallest l for which b(l)=1. The next span in the span pattern begins at the smallest l not included in the previous span(s) for which b(l)=1.

The span duration is max{maximum value for all CORESET durations, minimum/maximum value of Y in the UE reported candidate value or in all predetermined applicable values for Y} or minimum/maximum value of Y in the UE reported candidate value or minimum/maximum value of Y in predetermined applicable values for Y except possibly the last span which can be of shorter duration. A particular PDCCH monitoring configuration meets the UE capability limitation if the span arrangement satisfies the gap separation for at least one (X, Y) in the UE reported candidate value set in every span pattern cycle, including cross span pattern cycle boundary.

For the first approach for determining a span pattern, a bit in the bitmap indicates slot index within the span pattern. The UE assumes any of the following: (1) the number of different start slot indices of spans for all PDCCH monitoring occasions per span pattern cycle is no more than floor (Z/X) (X is minimum/maximum among values reported by the UE or predetermined applicable values). For example, when Z=X, there is only one start slot index for one span per span pattern cycle; (2) the number of different start slot indices of PDCCH monitoring occasions per span pattern cycle is no more than a predetermined value, for example Z/2 or 7 or 1; (3) the number of different start slot indices of PDCCH monitoring occasions per half span pattern cycle is no more than a predetermined value, for example 4, in SCell; or (4) the number of consecutive "1" indicates a span duration. In one example, the span duration is same across all span cycles.

In a second approach for determining a span pattern, a bitmap $$b(l), 0 \leq l \leq \frac{Z}{X} - 1$$

is generated, where X is minimum/maximum among values reported by a UE or among predetermined applicable values, b(l)=1 if slots {l·X, l·X+1, ..., l·X+X−1} in the span pattern has at least one monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value for all CORESET durations, minimum/maximum value of Y in the UE reported candidate value or in all predetermined applicable values for Y} or minimum/maximum value of Y in the UE reported candidate value or minimum/maximum value of Y in predetermined applicable values for Y except possibly the last span which can be of shorter duration.

A particular PDCCH monitoring configuration meets the UE capability limitation if the span arrangement satisfies the gap separation for at least one (X, Y) in the UE reported candidate value set in every span pattern cycle, including cross span pattern cycle boundary.

For the second approach for determining a span pattern, a bit in the bitmap indicates span index within the span pattern. The UE assumes any of the following: (1) the number of different span indices of PDCCH monitoring occasions per span pattern cycle is no more than a predetermined value, for example Z/X/2 or 7; and/or (2) the number of different span indices of PDCCH monitoring occasions per half span pattern cycle is no more than a predetermined value, for example Z/X/4 or 4, in SCell.

In a third approach for determining a span pattern, a bitmap b(l), $0 \leq l \leq Z \cdot N_{symb}^{slot} - 1$ is generated, where $N_{symb}^{slot} = 14$ is number of OFDM symbols per slot, b(l)=1 if symbol l in the span pattern is part of a PDCCH monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value for all CORESET durations, minimum/maximum value of Y in the UE reported candidate value or in all predetermined applicable values for Y} or minimum/maximum value of Y in the UE reported candidate value or minimum/maximum value of Y in predetermined applicable values for Y except possibly the last span which can be of shorter duration.

A particular PDCCH monitoring configuration meets the UE capability limitation if the span arrangement satisfies the gap separation for at least one (X, Y) in the UE reported candidate value set in every span pattern cycle, including cross span pattern cycle boundary.

For the third approach for determining a span pattern, a bit in the bitmap indicates symbol index within the span pattern. The UE assumes any of the following: (1) the number of different start symbol indices of spans for all PDCCH monitoring occasions per span pattern cycle is no more than floor(14Z/X) (X>14 symbols is minimum among values reported by a UE); (2) the number of different start symbol indices of PDCCH monitoring occasions per span pattern cycle is no more than a predetermined value, for example 14Z/2 or 7; and/or (3) the number of different start symbol indices of PDCCH monitoring occasions per half span pattern cycle is no more than a predetermined value, for example 4, in a SCell.

In a fourth approach for determining a span pattern, a bitmap b(l), 0≤l≤Z−1 is generated, where b(l)=1 if slot l in the span pattern is a first slot of a span configured with one or more consecutive monitoring occasion(s), and b(l)=0 otherwise. The start slot for the first span in the span pattern begins at the smallest l for which b(l)=1. The span duration is max{maximum value for all CORESET durations, minimum/maximum value of Y in the UE reported candidate value or in all predetermined applicable values for Y} or minimum/maximum value of Y in the UE reported candidate value or minimum/maximum value of Y in predetermined applicable values for Y except possibly the last span which can be of shorter duration.

A particular PDCCH monitoring configuration meets the UE capability limitation if the span arrangement satisfies the gap separation for at least one (X, Y) in the UE reported candidate value set in every span pattern cycle, including cross span pattern cycle boundary.

For the fourth approach for determining a span pattern, the UE assumes any of the following: (1) the number of different start slot indices of spans for all PDCCH monitoring occasions per span pattern cycle is no more than floor (Z/X) (X is minimum/maximum among values reported by the UE or minimum/maximum value among predetermined applicable values for X). For example, when Z=X, there is only one start slot index for one span per span pattern cycle; (2) the number of different start slot indices of PDCCH monitoring occasions per span pattern cycle is no more than a predetermined value, for example Z/2 or 7 or 1; and/or (3) the number of different start slot indices of PDCCH monitoring occasions per half span pattern cycle is no more than a predetermined value, for example 4, in a SCell.

For determining the value of Z, a UE can use any of the following methods.

In one embodiment of a first method, the UE assumes Z is fixed and defined in the specification of the system operation. For example, 8 slots.

In another embodiment of a second method, the UE assumes Z is determined based on SCS configuration, u, for PDCCH monitoring. For example, $$Z = 2^{\frac{u}{u0}} \cdot a,$$

where u0 is a reference SCS configuration, e.g., u0=4, and a is a positive integer, e.g., a=4.

In yet another embodiment of a third method, Z is reported to gNB as UE capability or UE assistance information.

In yet another embodiment of a fourth method, Z is determined based on the set of configured PDCCH monitoring periodicities (denoting the set of configured PDCCH monitoring periodicities as $\{P_1, \ldots, P_S\}$).

In such embodiment, in one example, Z is the least common denominator (LCD) of the set of configured PDCCH monitoring periodicities, e.g., $Z=LCD(\{P_1, \ldots, P_S\})$. In another example, Z is the greatest common factor (GCF) of the set of configured PDCCH monitoring periodicities, e.g., $Z=GCF(\{P_1, \ldots, P_3\})$. In yet another example, Z is the maximum of the set of configured PDCCH monitoring periodicity, e.g., $Z=\max(\{P_1, \ldots, P_S\})$. In yet another example, Z is the minimum of the set of configured PDCCH monitoring periodicity, e.g., $Z=\min(\{P_1, \ldots, P_3\})$.

In yet another embodiment of a sixth method, Z is determined based on X. For example, Z=X, where there is up to one span of PDCCH monitoring occasion(s) per a span pattern cycle.

To support span pattern with multi-slot PDCCH monitoring based on X, where X is minimum/maximum among values reported by a UE or minimum/maximum candidate value for X predefined in the specification of the system, a UE assumes any of the following restrictions on PDCCH monitoring periodicity of a search space set configuration.

In one example, the UE assumes greatest common factor of all PDCCH monitoring periodicities from configured search space sets is not smaller than X, e.g., GCF $(\{P_1, \ldots, P_S\}) \geq X$.

In another example, the UE assumes a PDCCH monitoring periodicity for a configured search space set is not smaller than X.

In another example, the UE assumes a PDCCH monitoring periodicity of $P_S$ slots for a configured search space set s, is an integer multiple of X, such that $P_S=k \cdot X$, $k=1$ or 2, . . . .

FIG. 7 illustrates an example of span pattern 700 for multi-slot PDCCH monitoring with X=4 slots according to embodiments of the present disclosure. An embodiment of the span pattern 700 shown in FIG. 7 is for illustration only.

As illustrated in FIG. 7, a UE has multi-slot PDCCH monitoring capability with X=4 slots. The UE is configured with a first search space set with PDCCH monitoring periodicity of 10 slots, and a second search space set with PDCCH monitoring periodicity of 5 slots. 701 and 702 are configured PDCCH monitoring occasions from the first search space set, while 703, 704, and 705 are configured PDCCH monitoring occasions from the second search space set. The UE determines a span pattern cycle of Z=5 slots. The time separation between two consecutive spans in every span pattern cycle and cross span pattern cycle boundary no smaller than X=4 slots. The UE determines of a bitmap of [11000] based on the first approach for determining the span pattern. The UE assumes the span pattern repeated in every Z=5 slots.

FIG. 8 illustrates another example of span pattern 800 for multi-slot PDCCH monitoring with X=4 slots according to embodiments of the present disclosure. An embodiment of the span pattern 800 shown in FIG. 8 is for illustration only.

As illustrated in FIG. 8, a UE has multi-slot PDCCH monitoring capability with X=4 slots. The UE is configured with a first search space set with PDCCH monitoring periodicity of 8 slots, and a second search space set with PDCCH monitoring periodicity of 4 slots. 801 and 802 are configured PDCCH monitoring occasions from the first search space set, while 803, 806, and 805 are configured PDCCH monitoring occasions from the second search space set. The UE determines a span pattern cycle of Z=X=4 slots. The time separation between two consecutive spans in every span pattern cycle and cross span pattern cycle boundary no smaller than X=4 slots. The UE determines of a bitmap of [1100] based on the first approach for determining the span pattern. The UE assumes the span pattern repeated in every Z=X=4 slots.

For a set of monitoring occasions which are within the same span, a UE assumes any of the following: (1) the UE processes one unicast DCI scheduling DL and one unicast DCI scheduling UL per scheduled CC across the set of monitoring occasions for FDD; (2) the UE processes one unicast DCI scheduling DL and two unicast DCI scheduling UL per scheduled CC across the set of monitoring occasions for TDD; and/or (3) the UE processes two unicast DCI scheduling DL and one unicast DCI scheduling UL per scheduled CC across the set of monitoring occasions for TDD.

A second embodiment of this disclosure considers adaptation on span pattern repeated in a cycle of $Z \geq 1$ slots for multi-slot PDCCH monitoring based on a minimum span gap of $X \geq 1$ slots and maximum span duration $Y \geq 1$ slots.

A UE can be configured with one or more span(s) up to Y slots per Z slots. When Z=X, there is one span up to Y slots per X slots. The start of a span within Z slots before adaptation can be determined based on configured applicable search space set(s), $n_{start}$. For the adaptation on span pattern, the UE can be provided with a time offset, $O_{span}$, where the UE determines the start of the span is adapted, such that $n'_{start}=n_{start}+O_{span}$ or $n'_{start}=\mod(n_{start}+O_{span}, X)$.

For determining the applicable search space set(s), at least one of the following examples can be considered: (1) the applicable search space set(s) are all configured search space sets; (2) the applicable search space set(s) are all configured USS sets; (3) the applicable search space set(s) are all configured USS sets and Type3 CSS sets; (4) the applicable search space set(s) are search space sets from current/activated search space set group (SSSG) UE is triggered to monitor by a DCI format; (5) the applicable search space set(s) are all configured Type0/0A/2 CSS sets; (6) the applicable search space set(s) are Type 1 CSS with dedicated RRC configuration and Type 3 CSS, and UE specific SS; and/or (7) the applicable search space set(s) are Type 1 CSS without dedicated RRC configuration and Type 0, 0A, and 2 CSS.

A UE can be provided by multiple applicable/candidate values for $O_{span}$ by higher layers per DL BWP/cell or defined in the specification of the system operation. $O_{span}$ can be in a unit of one slot. When Z=X, for one example, a candidate value for $O_{span}$ can be any value in the range of 0 to X−Y−1; and for another example, a candidate value for $O_{span}$ can be any value in the range of 0 to X−1; and for yet another example, a candidate value for $O_{span}$ can be any value in the range of 0 to X−2.

In a first approach for adaptation on span pattern, $O_{span}$ can be provided to a UE explicitly based on any of the following methods.

In one embodiment of a first method, $O_{span}$ can be provided to a UE by a DCI format, where the DCI format is configured with a field to indicate one of multiple candidate values for $O_{span}$. In one example, the DCI format can be a DCI format to schedule a PDSCH/PUSCH with CRC bits scrambled by C-RNTI. In another example, the DCI format can be carried in a common PDCCH from a CSS set. The configuration of the CSS set can be included in UE-specific RRC parameter(s). Alternatively, the configuration of the CSS set can be in SIB.

In one embodiment of a second method, $O_{span}$ can be provided to a UE by a MAC CE, where the MAC CE indicates one of multiple candidate values for $O_{span}$.

In one embodiment of a third method, $O_{span}$ can be provided to the UE during a beam failure recovery (BFR) process.

In one embodiment of a fourth method, $O_{span}$ can be provided to the UE during a random access procedure (e.g., msg2 or msg4 in 4-step RACH procedure or msgB in 2-step RACH procedure).

In one further consideration, the DCI format or MAC CE can be received by the UE during beam failure recovery (BFR) process. For example, the DCI format or a DCI format to schedule the PDSCH for the MAC CE is received by the UE in a search space set configured dedicated for BFR. For another example, the DCI format or a DCI format to schedule the PDSCH for the MAC CE has CRC bits scrambled by RA-RNTI.

In a second approach for adaptation on span pattern, $O_{span}$ can be provided to a UE implicitly. In a one method, $O_{span}$ can be derived by the UE based on a search space set #0. When the UE is indicated to update/switch a TCI state or a QCL reference in terms of a SSB index for one or more PDCCH monitoring occasions (MOs) to monitor in search space set #0. The UE can derive $O_{span}$ based on the slot shift, $O_{shift}$, for the PDCCH MO(s) to monitor in search space set #0. For example, $O_{span}=O_{shift}$.

For example, during a BFR procedure, the UE can determine a $O_{shift}$ from the change of the MOs in search space set #0, and apply it for a set of search space set(s) from the examples described in this disclosure.

In a third embodiment, a UE can report multiple supported capabilities, corresponding to multiple values for the combination (X, Y), wherein X and Y are both in the unit of slot. The UE can determine a subset S from the set of reported combinations (X, Y), and perform PDCCH monitoring according to the determined subset of combinations (X, Y). For one example, the determined subset S of combinations (X, Y) only has a single combination.

A UE can determine a default value for the combination (X, Y), for example, (X, Y)=(4, 1) or (8, 1). In one use case, the default value is applied to PDCCH monitoring in an initial DL BWP. In another use case, the default value is applied to PDCCH monitoring in an active DL BWP before UE reports a capability of one or more combinations of (X, Y). In yet another use case, the default value can be applied to a group of search space sets when UE is configured for search space set group switching. The group of search space sets associated with the default value can be predetermined. For example, the group of search space sets associated with the default value are search space sets that are not configured with any search space set group index. For another example, the group of search space sets associated with the default value are search space sets that are configured with search space set group index of "0".

In one approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X,Y), wherein the subset S has a single combination (X, Y), and the combination (X, Y) is determined according to a maximum value of reported X first, and then a maximum value of reported Y within all associated values of Y with the determined value of X.

In another approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X,Y), wherein the subset S has a single combination (X, Y), and the combination (X, Y) is determined according to a maximum value of reported X first, and then a minimum value of reported Y within all associated values of Y with the determined value of X.

In yet another approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X,Y), wherein the subset S has a single combination (X, Y), and the combination (X,Y) is determined according to a minimum value of reported X first, and then a minimum value of reported Y within all associated values of Y with the determined value of X.

In yet another approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X, Y), wherein the subset S has a single combination (X, Y), and the combination (X, Y) is determined according to a minimum value of reported X first, and then a maximum value of reported Y within all associated values of Y with the determined value of X.

In one approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X, Y), wherein the subset S has a single combination (X, Y), and the combination (X, Y) is determined according to be associated with the largest maximum number of BD/CCE limit, and if there are multiple combinations (X, Y) with a tie maximum number of BD/CCE limit, then determine (X, Y) according to a maximum value of reported Y from the selected subset of combinations (X, Y) that have tied maximum number of BD/CCE limit.

In another approach, if a UE reports multiple combinations of (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of reported combinations (X, Y), wherein the subset S has a single combination (X, Y), and the combination (X, Y) is determined according to be associated with the largest maximum number of BD/CCE limit, and if there are multiple combinations (X, Y) with a tie maximum number of BD/CCE limit, then determine (X, Y) according to a minimum value of reported Y from the selected subset of combinations (X, Y) that have tied maximum number of BD/CCE limit.

In one approach, the UE determines the subset from the set of reported combinations (X, Y) according to the following steps: 1) in a first step, the UE determines a valid subset V from the reported combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) as the subset S from the set of reported combinations (X, Y), by selecting the combination (X, Y) with the smallest value of Y from the subset S'.

In another approach, the UE determines the subset from the set of reported combinations (X, Y) according to the following steps: 1) in a first step, the UE determines a valid subset V from the reported combinations (X, Y), wherein a combination (X, Y) is determined as valid if a configuration of search space sets to the UE for PDCCH monitoring on a cell can satisfy of PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) as the subset S from the set of reported combinations (X, Y), by selecting the combination (X, Y) with the largest value of Y from the subset S'.

In yet another approach, the UE determines the subset from the set of reported combinations (X, Y) according to the following steps: 1) in a first step, the UE determines a valid subset V from the reported combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) from the subset S' up to its implementation.

In yet another approach, the UE determines the subset from the set of reported combinations (X, Y) according to the following steps: 1) in a first step, the UE determines a valid subset V from the reported combinations (X, Y), wherein a combination (X, Y) is determined as valid if a configuration of search space sets to the UE for PDCCH monitoring on a cell can satisfy of PDCCH monitoring per a group of slots according to at least one of the combinations (X, Y) (e.g., a subset from the configured search space sets to be confined within the Y slots in the X slots). 2) in a second step, the UE determines a subset S from the valid subset V by selecting one or multiple combinations (X, Y) from the valid subset V associated with the largest maximum number of BD/CCE limit (e.g., there could be tied value of maximum number of BD/CCE limit, such that the subset S may have one or multiple combinations of (X, Y)).

In the above approach of this embodiment, the search space sets that are required to be confined within the Y slots can be at least one from Type1-PDCCH CSS set provided by dedicated higher layer signalling, Type3-PDCCH CSS sets, and USS sets.

In another embodiment, a UE can report multiple supported capabilities, corresponding to multiple values for the combination (X, Y), wherein X and Y are both in the unit of slot, and before the UE reports one or multiple values for the combination (X, Y), the UE can determine a subset S from the set of all possible values for combinations (X, Y), and perform PDCCH monitoring according to the determined subset of combinations (X, Y). For one example, the determined subset S of combinations (X, Y) only has a single combination.

In one approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to a maximum value of all possible values of X first, and then a maximum value of all possible values of Y within all associated values of Y with the determined value of X.

In another approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to a maximum value of all possible values of X first, and then a minimum value of all possible values of Y within all associated values of Y with the determined value of X.

In yet another approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to a minimum value of all possible values of X first, and then a maximum value of all possible values of Y within all associated values of Y with the determined value of X.

In yet another approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to a minimum value of all possible values of X first, and then a minimum value of all possible values of Y within all associated values of Y with the determined value of X.

In one approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to be associated with the largest maximum number of BD/CCE limit, and if there are multiple combinations (X, Y) with a tie maximum number of BD/CCE limit, then determine (X, Y) according to a maximum value of all possible values of Y from the selected subset of combinations (X, Y) that have tied maximum number of BD/CCE limit.

In one approach, before the UE reports one or multiple values for the combination (X, Y), and a configuration of search space sets to the UE for PDCCH monitoring on a cell results to satisfy the restriction of PDCCH monitoring per a group of slots according to at least one of the combinations (X, Y) (e.g., a subset from the configured search space sets to be confined within the Y slots in the X slots), the UE monitors PDCCH on the cell according to a subset S from the set of all possible values of combinations (X, Y), wherein the subset S has a single combination (X, Y), and the combination (X, Y) is determined according to be associated with the largest maximum number of BD/CCE limit, and if there are multiple combinations (X, Y) with a tie maximum number of BD/CCE limit, then determine (X, Y) according to a minimum value of all possible values of Y from the selected subset of combinations (X, Y) that have tied maximum number of BD/CCE limit.

In one approach, before the UE reports one or multiple values for the combination (X, Y), the UE determines the subset from the set of all possible values of combinations (X, Y) according to the following steps: 1) in a first step, the UE determines a valid subset V from all possible values of combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) as the subset S from the set of all possible values of combinations (X, Y), by selecting the combination (X, Y) with the smallest value of Y from the subset S'.

In another approach, before the UE reports one or multiple values for the combination (X, Y), the UE determines the subset from the set of all possible values of combinations (X, Y) according to the following steps: 1) in a first step, the UE determines a valid subset V from all possible values of combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) as the subset S from the set of all possible values of combinations (X, Y), by selecting the combination (X, Y) with the largest value of Y from the subset S'.

In yet another approach, before the UE reports one or multiple values for the combination (X, Y), the UE determines the subset from the set of all possible values of combinations (X, Y) according to the following steps: 1) in a first step, the UE determines a valid subset V from all possible values of combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S' from the valid subset V by selecting one or multiple combinations (X, Y) from the valid subset V associated with the largest maximum number of BD/CCE limit. 3) in a third step, the UE determines a single combination (X, Y) from the subset S' up to its implementation.

In yet another approach, before the UE reports one or multiple values for the combination (X, Y), the UE determines the subset from the set of all possible values of combinations (X, Y) according to the following steps: 1) in a first step, the UE determines a valid subset V from all possible values of combinations (X, Y), wherein a combination (X, Y) is determined as valid if a configuration of search space sets to the UE for PDCCH monitoring on a cell can satisfy PDCCH monitoring per a group of slots according to at least one of the combinations (X, Y) (e.g., a subset from the configured search space sets to be confined within the Y slots in the X slots). 2) in a second step, the UE determines a subset S from the valid subset V by selecting one or multiple combinations (X, Y) from the valid subset V associated with the largest maximum number of BD/CCE limit (e.g., there could be tied value of maximum number of BD/CCE limit, such that the subset S may have one or multiple combinations of (X, Y)).

In the above approach of this embodiment, the search space sets that are required to be confined within the Y slots can be at least one from Type1-PDCCH CSS set provided by dedicated higher layer signalling, Type3-PDCCH CSS sets, and USS sets.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive a configuration for search space sets; and
a processor operably coupled to the transceiver, the processor configured to determine:
 a combination (X, Y), wherein X and Y are positive integers and wherein a start of two consecutive group of Y slots is separated by X slots; and
 a bitmap for a search space set from the search space sets based on the configuration, wherein:
  each bit in the bitmap is associated with a slot within a group of consecutive slots that are configured for multi-slot physical downlink control channel (PDCCH) monitoring,
  a slot is configured for the multi-slot PDCCH monitoring if the associated bit for the slot in the bitmap has a value of "1",
  a slot is not configured for the multi-slot PDCCH monitoring if the associated bit for the slot in the bitmap has a value of "0", and
  slots configured for the multi-slot PDCCH monitoring are consecutive based on bits with a value of "1" being consecutive in the bitmap, and
 wherein the transceiver is further configured to receive PDCCHs in the consecutive slots configured for the multi-slot PDCCH monitoring based on the bitmap.

2. The UE of claim 1, wherein the processor is further configured to determine:
that the search space sets include at least one of:
 a Type-1 PDCCH common search space (CSS) set, wherein the configuration is provided by UE specific Radio Resource control (RRC) signaling,
 a Type3 PDCCH CSS set, and
 a UE specific search space (USS) set; and
that a number of the bits with a value of "1" in the bitmap is no more than Y.

3. The UE of claim 1, wherein the processor is further configured to determine a default value for the combination, wherein:
the default value is (4, 1) or (8, 1), and
the default value is applicable for at least one of:
 PDCCH receptions in an initial downlink (DL) bandwidth part (BWP),
 PDCCH receptions before a report of a capability of the UE, and
 PDCCH receptions according to a predetermined group of search space sets.

4. The UE of claim 1, wherein the configuration includes a periodicity of a number of slots (T), for each search space set from the search space sets, wherein the periodicity is equal to a multiple of X, such that T=k·X, where k is a positive integer.

5. The UE of claim 1, wherein the processor is further configured to determine:
a number of combinations based on one of:
 a capability of the UE, wherein the transceiver is further configured to transmit the capability, and any of predetermined values from: (4, 1), (4, 2), (8,1) or (8, 4); and
that the combination (X, Y) is one of the number of combinations.

6. The UE of claim 5, wherein:
a combination in the number of combinations is associated with a maximum number of candidate PDCCH receptions over a corresponding maximum number of non-overlapped control channel elements (CCEs), and
the combination (X, Y) has a maximum value for associated maximum number of candidate PDCCH receptions among the number of combinations.

7. The UE of claim 5, wherein the processor is further configured to determine the combination (X, Y) based on at least one of:
the combination (X, Y) has a minimum value for X among the number of combinations,
the combination (X, Y) has a maximum value for Y among the number of combinations,
the combination (X, Y) has a maximum value for X among the number of combinations, and
the combination (X, Y) has a minimum value for Y among the number of combinations.

8. A base station (BS), comprising:
a transceiver configured to transmit a configuration for search space sets; and
a processor operably coupled to the transceiver, the processor configured to determine:
 a combination (X, Y), wherein X and Y are positive integers and wherein a start of two consecutive group of Y slots is separated by X slots; and
 a bitmap for a search space set from the search space sets based on the configuration, wherein:
  each bit in the bitmap is associated with a slot within a group of consecutive slots that are configured for multi-slot physical downlink control channel (PDCCH) transmission,
  a slot is configured for the multi-slot PDCCH transmission if the associated bit for the slot in the bitmap has a value of "1",
  a slot is not configured for the multi-slot PDCCH transmission if the associated bit for the slot in the bitmap has a value of "0", and
  slots configured for the multi-slot PDCCH transmission are consecutive based on bits with a value of "1" being consecutive in the bitmap, and
 wherein the transceiver is further configured to transmit PDCCHs in the consecutive slots configured for the multi-slot PDCCH transmission based on the bitmap.

9. The BS of claim 8, wherein the processor is further configured to determine:
that the search space sets include at least one of:
 a Type-1 PDCCH common search space (CSS) set, wherein the configuration is provided by user equipment (UE) specific Radio Resource control (RRC) signaling,
 a Type3 PDCCH CSS set, and
 a UE specific search space (USS) set; and
that a number of the bits with a value of "1" in the bitmap is no more than Y.

10. The BS of claim 8, wherein the processor is further configured to determine a default value for the combination, wherein:
the default value is (4, 1) or (8,1), and
the default value is applicable for at least one of:
 PDCCH transmissions in an initial downlink (DL) bandwidth part (BWP),
 PDCCH transmissions before a report of a capability of a user equipment (UE), and
 PDCCH transmissions according to a predetermined group of search space sets.

11. The BS of claim 8, wherein the configuration includes a periodicity of a number of slots (T), for each search space set from the search space sets, wherein the periodicity is equal to a multiple of X, such that T=k·X, where k is a positive integer.

12. The BS of claim 8, wherein the processor is further configured to determine:
a number of combinations based on one of:
  a capability of a user equipment (UE), wherein the transceiver is further configured to receive the capability, and
  any of predetermined values from: (4, 1), (4, 2), (8,1) or (8, 4); and
that the combination (X, Y) is one of the number of combinations.

13. The BS of claim 12, wherein:
a combination in the number of combinations is associated with a maximum number of candidate PDCCH transmissions over a corresponding maximum number of non-overlapped control channel elements (CCEs), and
the combination (X, Y) has a maximum value for associated maximum number of candidate PDCCH transmissions among the number of combinations.

14. The BS of claim 12, wherein the processor is further configured to determine the combination (X, Y) based on at least one of:
  the combination (X, Y) has a minimum value for X among the number of combinations,
  the combination (X, Y) has a maximum value for Y among the number of combinations,
  the combination (X, Y) has a maximum value for X among the number of combinations, and
  the combination (X, Y) has a minimum value for Y among the number of combinations.

15. A method performed by a user equipment (UE), the method comprising:
receiving a configuration for search space sets;
determining:
  a combination (X, Y), wherein X and Y are positive integers and wherein a start of two consecutive group of Y slots is separated by X slots; and
  a bitmap for a search space set from the search space sets based on the configuration, wherein:
    each bit in the bitmap is associated with a slot within a group of consecutive slots that are configured for multi-slot physical downlink control channel (PDCCH) monitoring,
    slot is configured for the multi-slot PDCCH monitoring if the associated bit for the slot in the bitmap has a value of "1",
    a slot is not configured for the multi-slot PDCCH monitoring if the associated bit for the slot in the bitmap has a value of "0", and
    slots configured for the multi-slot PDCCH monitoring are consecutive based on bits with a value of "1" being consecutive in the bitmap; and
receiving PDCCHs in the consecutive slots configured for the multi-slot PDCCH monitoring based on the bitmap.

16. The method of claim 15, further comprising determining:
that the search space sets include at least one of:
  a Type-1 PDCCH common search space (CSS) set, wherein the configuration is provided by user equipment (UE) specific Radio Resource control (RRC) signaling,
  a Type3 PDCCH CSS set, and
  a UE specific search space (USS) set; and
that a number of the bits with value of "1" in the bitmap is no more than Y.

17. The method of claim 15, further comprising determining a default value for the combination, wherein:
the default value is (4, 1) or (8, 1), and
the default value is applicable for at least one of:
  PDCCH receptions in an initial downlink (DL) bandwidth part (BWP),
  PDCCH receptions before a report of a capability of the UE, and
  PDCCH receptions according to a predetermined group of search space sets.

18. The method of claim 15, further comprising determining the configuration includes a periodicity of a number of slots (T), for each search space set from the search space sets, wherein the periodicity is equal to a multiple of X, such that T=k·X, where k is a positive integer.

19. The method of claim 15, further comprising:
transmitting a capability of a user equipment (UE); and
determining:
  a number of combinations based on one of:
    the capability of the UE, and
    any of predetermined values from: (4, 1), (4, 2), (8,1) or (8, 4); and
  that the combination (X, Y) is one of the number of combinations.

20. The method of claim 19, further comprising determining:
a combination in the number of combinations is associated with a maximum number of candidate PDCCH receptions over a corresponding maximum number of non-overlapped control channel elements (CCEs), and
the combination (X, Y) based on the at least one of:
  the combination (X, Y) has a maximum value for associated maximum number of candidate PDCCH receptions among the number of combinations,
  the combination (X, Y) has a minimum value for X among the number of combinations,
  the combination (X, Y) has a maximum value for Y among the number of combinations,
  the combination (X, Y) has a maximum value for X among the number of combinations, and
  the combination (X, Y) has a minimum value for Y among the number of combinations.

* * * * *